(12) United States Patent
Grigoriev et al.

(10) Patent No.: US 8,084,525 B2
(45) Date of Patent: Dec. 27, 2011

(54) USE OF ORGANOPHOSPHORUS COMPOUNDS AS CREPING AIDS

(75) Inventors: Vladimir A. Grigoriev, Chicago, IL (US); Gary S. Furman, St. Charles, IL (US); Sammy L. Archer, Lynnwood, WA (US)

(73) Assignee: Nalco Company, Naperville, IL (US)

( * ) Notice: Subject to any disclaimer, the term of this patent is extended or adjusted under 35 U.S.C. 154(b) by 1342 days.

(21) Appl. No.: 11/369,133

(22) Filed: Mar. 6, 2006

(65) Prior Publication Data

US 2007/0208115 A1  Sep. 6, 2007

(51) Int. Cl.
*C08K 5/00* (2006.01)
(52) U.S. Cl. .................. 524/145; 524/503; 524/557
(58) Field of Classification Search .................. 524/115, 524/125, 128, 145, 503, 557
See application file for complete search history.

(56) References Cited

U.S. PATENT DOCUMENTS

| | | | |
|---|---|---|---|
| 3,925,289 A * | 12/1975 | Sakato et al. ............ 524/101 |
| 4,883,564 A | 11/1989 | Chen et al. | |
| 5,032,632 A * | 7/1991 | Saxton ..................... 524/139 |
| 5,370,773 A | 12/1994 | Luu et al. | |
| 6,165,322 A * | 12/2000 | Bower ..................... 162/164.3 |
| 6,280,571 B1 * | 8/2001 | Allen ....................... 162/111 |
| 7,404,875 B2 * | 7/2008 | Clungeon et al. ......... 162/111 |
| 2003/0195296 A1 * | 10/2003 | Dames et al. ............. 525/154 |
| 2005/0006040 A1 | 1/2005 | Boettcher et al. | |

FOREIGN PATENT DOCUMENTS

| | | |
|---|---|---|
| EP | 1109971 | 10/2004 |
| WO | WO 00/09806 | 2/2000 |

* cited by examiner

*Primary Examiner* — Peter D Mulcahy
(74) *Attorney, Agent, or Firm* — Benjamin E. Carlsen; Michael B. Martin

(57) ABSTRACT

A modified creping adhesive composition comprising at least one adhesive component and at least one modifier component, said modifier component comprising an organophosphorus compound is disclosed and claimed. A method of creping a paper web comprising: applying to a rotating creping cylinder an effective amount of a modified creping adhesive composition comprising at least one adhesive component and at least one modifier component, said modifier component comprising an organophosphorus compound; pressing a paper web against the creping cylinder to effect adhesion of the paper web to the creping cylinder; and dislodging the paper web from the creping cylinder with a doctor blade is also disclosed and claimed.

16 Claims, No Drawings

USE OF ORGANOPHOSPHORUS
COMPOUNDS AS CREPING AIDS

FIELD OF THE INVENTION

This invention relates to a composition and method for creping a paper web by applying an adhesive composition that contains one or more organophosphorus compounds.

BACKGROUND OF THE INVENTION

Desired properties of tissue, including softness, bulk, stretch and absorbency, are achieved during a papermaking process by subjecting a paper web to a creping cylinder, for example a steam-heated Yankee Dryer, and a doctor blade. Prior to this stage, a wet fiber web has been largely dewatered at the pressure roll nip, or by a through air dryer (TAD) process. The mechanical action of the doctor blade results in a disruption of the fiber-fiber bonds and a formation of a microfold structure within the sheet.

In order to develop the crepe, the paper web has to adhere to the surface of the creping cylinder. Applying an adhesive to the dryer provides the adhesion. Most common creping cylinder adhesives are synthetic polymers such as polyaminoamides, polyamides, polyamines, polyvinylamines, polyvinyl alcohols, polyvinyl acetates, polyacrylamides, polyvinylpyrrolidones and polyethers. Other natural and derivatized natural polymers may also be employed including starch, guar gum, carboxymethyl cellulose, hydroxyethyl cellulose, hydroxypropyl cellulose and the like. Various low molecular weight compounds are used to modify the creping cylinder coating properties.

A superior creping cylinder coating should form a film that provides good adhesion for efficient creping, and is also uniform, durable and soft. Uniformity of the coating is critical not only for consistent creping that affects the quality of the produced sheet, but also for even coverage of the creping cylinder surface to prevent premature wear of the cylinder and the blade. Durability is a characteristic of how stable the coating is on the creping cylinder surface, particularly at the pressure roll nip. If the coating is easily washed off, it does not protect the creping cylinder and leads to excessive creping blade wear. A hard coating causes blade chatter, which results in blade wear and non-uniform creping. A soft, but durable coating is preferred.

Tissue manufacturers are constantly striving to improve operational efficiency and product quality. Operations continue to be faced with issues such as hard coating build-up, chatter, loss of adhesion, and non-uniform coatings as creping cylinder surface temperatures are increased and/or sheet moisture contents are decreased in order to obtain better sheet properties from the creping process. Thus, there is a need for additional modifying agents that improve the product application window with regard to the creping cylinder temperature and moisture conditions.

SUMMARY OF THE INVENTION

The present invention provides for a modified creping adhesive composition, which comprises an adhesive component and at least one modifier component, said modifier component comprising an organophosphorus compound.

The present invention also provides for a method of creping a paper web comprising: applying to a rotating creping cylinder a modified creping adhesive composition which comprises an adhesive component and at least one modifier component, said modifier component comprising an organophosphorus compound; pressing a paper web against the creping cylinder to effect adhesion of the paper web to the creping cylinder; and dislodging the paper web from the creping cylinder with a doctor blade.

DETAILED DESCRIPTION OF THE INVENTION

Definitions:

"Organophosphorus compounds" mean one of a series of derivatives of phosphorous that have at least one organic group attached to the phosphorous atom linked either directly to a carbon atom or indirectly by means of another element. Examples of organophosphorus compounds include, but are not limited to, the following set of compounds: glycerophosphate; triethanolamine phosphate esters; sorbitol phosphate esters; phosphate esters of alcohols and polyols containing up to six hydroxyl groups; phosphosuccinic oligomer; esters of phosphinic and phosphonic acids; and phosphate esters of glycerol, glycol, and sorbitol.

"PAE" means polyaminoamide-epichlorohydrin. Polyaminoamide-epichlorohydrin resins useful in the composition of this invention are water soluble, cationic thermosetting or non-thermosetting resins typically prepared by reacting one or more polyalkylene polyamines containing secondary amine groups and one or more dicarboxylic acid derivatives to form a polyaminoamide and then reacting the polyaminoamide with epichlorohydrin to form the polyaminoamide-epichlorohydrin resin.

"PVOH" means polyvinylalcohol.

"DAP" means diammonium phosphate.

"MAP" means monoammonium phosphate.

"DI" deionized water.

"GPh" means glycerophosphate.

"α-GPh" means alpha-glycerophosphate.

"PSO" means phosphosuccinic oligomer. PSO is described in U.S. Pat. No. 6,572,789, which is herein incorporated by reference.

"Paper web" refers to one or more sheets of paper made by a process comprising the steps of forming an aqueous papermaking furnish; depositing this furnish onto a foraminous surface, such as a Fourdrinier wire, and removing the water from the furnish either by gravity, by vacuum assisted drainage, by mechanical pressing, or by evaporative means (e.g. TAD). In the final step of the process, the desirable functional properties and textural characteristics, such as softness, absorbency and bulk, are imparted to the paper by a creping process comprising: a) applying an adhesive composition, in the present case a modified creping adhesive composition, to the surface of a creping cylinder; b) adhering a cellulosic web to the creping cylinder and; c) dislodging the adhered web from the creping cylinder with a doctor blade.

The paper web can be comprised of various types of natural and synthetic fibers including wood pulps of chemical and mechanical types, vegetable fibers, recycled fibers and synthetic fibers such as polypropylene. The paper web can also be comprised of particulate fillers, such as kaolin clay, titanium dioxide, and/or calcium carbonate.

As stated above, the present invention provides for a modified creping adhesive composition, which comprises an adhesive component and at least one modifier component, the modifier component comprising an organophosphorus compound. The modified creping adhesive composition is in liquid form. For example, the modified creping adhesive composition may be in the form of an aqueous solution or depending on solubility factors, in the form of dispersion.

In one embodiment, an aqueous modified creping adhesive composition comprises from about 0.01 to about 50 weight percent of the modified creping adhesive composition and about 99.99 to about 50 weight percent water.

In another embodiment, the modified creping adhesive composition comprises from about 0.01 to about 40 weight percent of the organophosphorus compound, based upon the total solids content of the composition. More preferably, the modified creping adhesive composition comprises about 20 weight percent of the organophosphorus compound, based upon the total solids content of the composition. Most preferably, the modified creping adhesive composition comprises about 5 weight percent of the organophosphorus compound, based upon the total solids content of the composition.

In another embodiment, the organophosphorus compound is selected from the group consisting of: phosphate esters of alcohols and polyols containing up to six hydroxyl groups; and a phosphosuccinic oligomer. In yet a further embodiment, the phosphated alcohols and polyols include the phosphate esters of glycerol, ethylene glycol, sorbitol, diethylene glycol, propylene glycol, dipropylene glycol, polyethylene glycol, diethanolamine, triethanolamine, 1,4-butanediol, glycerolamine and monoisopropanolamine.

In another embodiment the organophophorus compound is selected from the group consisting of: glycerophosphate; triethanolamine phosphate esters; and sorbitol phosphate esters.

One or more types of chemicals may be utilized as the adhesive component in the modified creping adhesive composition of the claimed invention. A person of ordinary skill in the art will choose a particular adhesive component based on one or more factors that include without limitation, the type of papermaking fiber that is being processed.

In one embodiment, the adhesive component utilized is selected from the group consisting of: polyvinyl alcohol; polyamidoamine-epichlorohydrin; polyamides; polyamines, polyvinylamines; polyvinyl acetates; polyacrylamides; polyvinylpyrrolidones; polyethers; starch; guar gum; carboxymethyl cellulose; hydroxyethyl cellulose; polyethyleneimines; and hydroxypropyl cellulose.

In addition to the adhesive component and adhesive modifier, the modified creping adhesive composition further comprises at least one papermaking additive. In one embodiment, the additive is selected from the group consisting of: a release agent, a tackifier, a surfactant, a dispersant, a salt which is effective to adjust water hardness, an acid or a base, and a combination thereof.

In a preferred embodiment, the modified creping adhesive composition is an aqueous modified creping adhesive composition comprising from about 20 percent to about 80 weight percent polyvinyl alcohol, from about 20 percent to about 80 weight percent polyamidoamine-epichlorohydrin, from about 1 percent to about 20 weight percent organic phosphate, and from about 99.99 to about 50 weight percent water. In yet a further embodiment of this preferred embodiment, the organic phosphate of the modified adhesive composition is selected from the group consisting of: glycerophosphate; triethanolamine phosphate esters; sorbitol phosphate esters; and phosphosuccinic oligomer.

A method of creping a paper web is also claimed in this application. The method comprises the step of applying to a rotating creping cylinder a modified creping adhesive composition which comprises an adhesive component and at least one modifier component, said modifier component comprising an organophosphorus compound; pressing a paper web against the creping cylinder to effect adhesion of the paper web to the creping cylinder; and dislodging the paper web from the creping cylinder with a doctor blade.

Various types of modified creping adhesives described in this application and their equivalents may be applied to the creping cylinder.

The modified creping adhesive composition may be applied to the creping cylinder by various means known to those of ordinary skill in the art. Typically, creping adhesive compositions are sprayed onto the surface of the creping cylinder. In conventional applications, the means for spraying is placed proximate to the creping cylinder surface. In one embodiment of the invention, a spray boom is placed proximate to the creping cylinder. Spray boom apparatuses are known in the art and they are exemplified in U.S. Patent Publication Nos. 2005/0245669, 20040177940 and 20040060675, which are herein incorporated by reference.

In one embodiment, the modified creping adhesive composition is applied to the creping cylinder in an amount from about 0.05 to 60 mg/m$^2$ dry solids to square meters of creping cylinder surface.

Carrying out the above stated methodology produces a crepe paper product. In one embodiment the crepe paper product is tissue paper. Tissue paper properties may be further adjusted by various methodologies known in the papermaking art, for example, by the addition of one or more types of chemistries to a furnish.

The present invention will be further described in the following examples. The examples are not intended to limit the invention prescribed by the appended claims.

EXAMPLE 1

This example demonstrates the anticorrosion properties of the organophosphorus compounds of this invention. The data in Table 1 shows the anticorrosive properties of the organophosphorus modifiers, phosphinosuccinic acid oligomers and alpha-glycerophosphate (α-GPh) compared to no additive and to the inorganic phosphate salt, diammonium phosphate (DAP). The level of calcium ("Ca") content in these experiments was varied between 10 and 100 ppm. At 10 ppm Ca ion, all of the phosphate containing additives provided improved (lower) corrosion rates compared to the blank. The advantage of PSO and α-GPh over DAP is apparent at the 100 ppm level of Ca ion. The DAP is not very calcium tolerant and precipitates, whereas the Ca-salts of PSO and α-GPh have much greater solubility. Thus PSO and α-GPh can continue to provide corrosion inhibition in waters containing elevated levels of Ca ion whereas DAP cannot.

TABLE 1

| Inhibitor | ppm Inhibitor | ppm CaCl2 | pH | temp. (° C.) | Total days of exposure | Type of corrosion | Corrosion rate (mpy) |
| --- | --- | --- | --- | --- | --- | --- | --- |
| None | n/a | 10 | 7 | 50 | 1 | general | 242.4 |
| DAP | 100 | 10 | 7 | 50 | 1 | general | 18.1 |
| PSO | 100 | 10 | 7 | 50 | 1 | general | 44.1 |
| alpha-GPh | 100 | 10 | 7 | 50 | 1 | general | 104.7 |
| None | n/a | 100 | 7 | 50 | 2 | general | 145.7 |

TABLE 1-continued

| Inhibitor | ppm Inhibitor | ppm CaCl2 | pH | temp. (° C.) | Total days of exposure | Type of corrosion | Corrosion rate (mpy) |
|---|---|---|---|---|---|---|---|
| DAP | 100 | 100 | 7 | 50 | precipitated, study stopped | | |
| PSO | 100 | 100 | 7 | 50 | 2 | general | 9.2 |
| alpha-GPh | 100 | 100 | 7 | 50 | 2 | general | 100.6 |

Procedure for Example 1: Glass cells (10.8 1) were used for running corrosion studies. The cells were supplied with pH and temperature control devices, as well as, with a water circulation system. The pH was balanced by bubbling air and $CO_2$ through the cell. The airflow was constant, while, the flow of $CO_2$ was automatically switched off and on if the pH was below or above 6.0. The cast iron (class 40) coupons were obtained from Metal Samples. Prior to use, the coupons were polished with sand paper (600 grit) and rinsed with water and acetone. The weight of coupons was measured prior to immersing them into the corrosion cells. A total of four corrosion runs were started at each $CaCl_2$ level, a blank (no inhibitor), DAP, PSO and α-GPh. The cells were filled with deionized (DI) water and additives. Each solution contained either 10 or 100 ppm of $CaCl_2$ and 100 ppm of a corrosion inhibitor (except blank). The pH of solution was adjusted to pH 6.0 with 50% NaOH (a few drops). The solutions were left to equilibrate to pH 6.0 and 50° C. The pH was independently rechecked with an external pH meter to ensure accuracy. Once the pH and the temperature stabilized, the coupons were completely immersed in the cells.

The corrosion studies were run for 48 hours except for DAP at 100 ppm $CaCl_2$. The DAP solution became vary cloudy, likely, due to formation of $Ca_3(PO_4)_2$. The DAP corrosion study at this $CaCl_2$ was, therefore, stopped. The other solutions remained clear until corrosion became significant. After a few hours, very serious corrosion was observed on the coupons in the blank experiments. In contrast, corrosion was less severe in the solution of α-GPh and no corrosion was observed with PSO and DAP at 10 ppm $CaCl_2$. After 48 hours, the coupons in the blank experiments were severely corroded, the coupons immersed in the solution of α-GPh were corroded less, and the coupons immersed in the solution of PSO were corroded only slightly. The coupons were removed from the solutions, pad dried and weighed. Based on a weight loss, the corrosion rate was calculated.

EXAMPLE 2

This example demonstrates the improved film rewetting properties imparted by the additives of this invention. Table 2 provides comparative data on the effect on inorganic phosphate salts and organophosphorus compounds of this invention regarding the rewettability of dried polyvinylalcohol (PVOH) films containing these additives. It is important for Yankee coating films to rewet, since the Yankee coating experiences repeated drying and wetting cycles. If the existing coating does not rewet, it will build up a hard layer that does not provide good adhesion for creping and can lead to operational issues such as blade chatter.

The absorption rate for a water drop dispensed onto the dried PVOH film was 0.0044 microliters per second. The PVOH films modified with 5% of the inorganic phosphate salts (DAP and MAP) resulted in decreased absorption rates. The organophosphorus additives of this invention show improved absorption rates, demonstrating that the PVOH films became more rewettable.

TABLE 2

| Modifier | Absorption rate (microL/s) |
|---|---|
| None | 0.0044 |
| DAP | 0.0013 |
| MAP | 0.0013 |
| PSO | 0.0057 |
| alpha-GPh | 0.0146 |
| beta-GPh | 0.0126 |

Procedure for Example 2: The rewettability of PVOH (Celvol 523 from Celanese) films was evaluated by measuring the absorbency rate of a water drop placed on the surface of the PVOH film. Films were prepared by spin coating a PVOH solution containing 5% of the modifier (based on PVOH solid content) onto a mica sheet. The films were dried in an oven at 150° C. for 2 hours. The dry films were stored in a desiccator prior to testing. The water drop absorbency rate was measured using a Dynamic Absorbency Tester (DAT 1100, Fibro System AB, Sweden). A 4-microliter water drop was dispensed onto the film surface and the change in volume was measured as a function of time. The rate of the water drop volume change was calculated using the linear part of the slope from 10-200 seconds after the water drop was dispensed. A total of six measurements were taken per each film sample and an average slope was calculated. The water absorption rate was calculated by correcting the water drop volume change for water evaporation, which was determined by running a control experiment with a non-absorbing plastic film.

EXAMPLE 3

This example demonstrates the ability of the additives of this invention to change the glass transition ($T_g$) temperature of Yankee dryer adhesive films. A commercially available PAE creping adhesive (Nalco 690HA) was used in the preparation of films modified by the creping additives of this invention. The $T_g$ can be used as a measure of the softness of the adhesive films, where a softer film is desired for good creping under high temperature and low moisture conditions. However, other conditions may exist where it is necessary to harden the coating to make it more durable on the Yankee surface. Therefore, it is an advantage to have a range of creping additives that can modify the $T_g$ of the adhesive coating in one direction or the other.

The data in Table 3 demonstrate that the organophosphorus additives of this invention can alter the PAE glass transition temperature. The PSO additive is useful for hardening the coating, whereas the glycerophosphate additives lower the $T_g$, or soften the coating. The data show that the GPh additives are not as aggressive in lowering the PAE $T_g$ as glycerol.

TABLE 3

| Additive | $T_g$ (° C.) | |
| --- | --- | --- |
| | 5% additive of 690HA solids | 20% additive of 690HA solids |
| None | 77 (no additive) | — |
| PSO | 78 | 91 |
| α-GPh | 66 | 67 |
| β-GPh | 71 | 67 |
| MAP | 74 | 67 |
| glycerol | 53 | 31 |

Procedure for Example 3: A TA 2920 differential scanning calorimeter DSC (TA Instruments, New Castle, Del.) was used to measure the glass transition temperature of the Yankee adhesive compositions. Adhesive film samples were prepared by casting films of Nalco 690HA, with the indicated amount of modifier, at 105° C. The DSC instrument was calibrated with an indium standard. The sample size for DSC analysis was about 10-15 mg. The sample was heated at a heating rate of 10° C./min. The glass transition temperature of polymer was determined from the second scan using a half-height method.

EXAMPLE 4

This example shows the ability of the organophophorus additives of this invention to increase the adhesion of creping adhesive films. In this example a commercial PAE creping adhesive (Nalco 03PV094) was used. The comparative inorganic phosphate salts (DAP and MAP) resulted in a loss of adhesion. The organophosphorus compounds of this invention increased the adhesion provided by the PAE film. For GPh the increase in adhesion was evident at both 5 and 20% GPh added to the PAE, whereas for PSO a 5% additive level increased adhesion over the PAE by itself.

TABLE 4

| Additive | Na-GPh | | DAP | | MAP | | PSO | |
| --- | --- | --- | --- | --- | --- | --- | --- | --- |
| concentration (wt % solids in polymer actives) | Peel force (g/in) | % change from control | Peel force (g/in) | % change from control | Peel force (g/in) | % change from control | Peel force (g/in) | % change from control |
| 0 | 374 | 0 | 487 | 0 | 487 | 0 | 449 | 0 |
| 5 | 445 | 19 | 444 | −9 | 422 | −13 | 512 | 14 |
| 20 | 433 | 16 | 331 | −26 | 356 | −27 | 414 | −8 |

Procedure for Example 4: The adhesion provided by the formulations of in Table 4 was measured by means of a wet tack peel adhesion test. This test measured the force required to peel a cotton strip from a heated metal plate. First an adhesive film, of the product of interest, was applied to the metal panel by means of a #40 coating rod. The adhesive was applied to the panel at 15% actives. The metal plate was heated to 100° C. and at this point a wet cotton strip was pressed into the film by means of a 1.9 kg cylindrical roller. After the strip was applied, the metal plate was placed in a 105° C. oven for 15 minutes to dry the strip. The metal plate was then clamped in a tensile testing apparatus. One end of the cotton cloth was clamped in the pneumatic grip of the tester and the cloth was peeled from the panel at an angle of 180° and at a constant speed. During the peeling the metal plate was controlled to a temperature of 100° C.

What is claimed is:

1. A modified creping adhesive composition comprising at least one adhesive component and at least one modifier component, said modifier component comprising an organophosphorus compound selected from the list consisting of: glycerophosphate; triethanolamine phosphate esters; sorbitol phosphate esters; and phosphate esters of alcohols and polyols containing up to six hydroxyl groups; said adhesive component being polyvinyl alcohol wherein when the composition when is applied as a film to a creping cylinder, the organophosphorous compound is uniformly dispersed through the composition and the organophosphorous compound provides improved rewetting properties to the composition.

2. The composition of claim 1, wherein said composition contains from about 0.01 to about 40 weight percent of said organophosphorus compound, based on the total solid content of the composition.

3. The composition of claim 1, wherein said composition contains about 20 weight percent of said organophosphorus compound, based on the total solid content of the composition.

4. The composition of claim 1, wherein said composition contains about 5 weight percent of said organophosphorus compound, based on the total solid content of the composition.

5. The composition of claim 1, wherein said adhesive component further comprises one item which is selected from the group consisting of: polyamidoamine-epichlorohydrin; polyamides; polyamines; polyvinylamines; polyvinyl acetates; polyacrylamides; polyvinylpyrrolidones; polyethers; starch; guar gum; carboxymethyl cellulose; hydroxyethyl cellulose; polyethyleneimines; hydroxypropyl cellulose and any combination thereof.

6. The composition of claim 1, wherein said organphosphorous compound is selected from the group consisting of: phosphate esters of alcohols and polyols containing up to six hydroxyl groups.

7. The composition of claim 1, wherein said organophosphorus compound is selected from the group consisting of glycerophosphate; triethanolamine phosphate esters; and sorbitol phosphate esters.

8. The composition of claim 1 further comprising at least one papermaking additive.

9. The composition of claim 8, wherein said papermaking additive is selected from the group consisting of: a release agent; a tackifier; a surfactant; a dispersant; a salt which is effective to adjust water hardness; an acid; a base; and a combination thereof.

10. An aqueous modified creping adhesive composition comprising from about 0.01 to about 50 percent by weight of the composition of claim 1 and about 99.99 to about 50 weight percent water.

11. The composition of claim 1, wherein from about 20 percent to about 80 weight percent of the composition is polyvinyl alcohol, from about 20 percent to about 80 weight percent of the composition is polyamidoaxnine-epichlorohydrin, from about 1 percent to about 20 weight percent of the composition is organophosphorus compound, and all on a solids basis, and that may further be diluted with water so that from about 99.99 to about 50 weight percent of the composition is water.

12. The aqueous modified creping adhesive composition of claim 11, wherein the organophosphorus compound is selected from the group consisting of: glycerophosphate; triethanolamine phosphate esters; and sorbitol phosphate esters.

13. The modified creping adhesive composition of claim 1 in which the organophosphorus compound inhibits metal corrosion.

14. The modified creping adhesive composition of claim 1 in which the organophosphorus compound so changes the lass transition temperature that the composition becomes softer.

15. A modified creping adhesive composition comprising at least one adhesive component and at least one modifier component, said modifier component comprising an organophosphorus compound selected from the list consisting of: glycerophosphate; triethanolamine phosphate esters; sorbitol phosphate esters; and phosphate esters of alcohols and polyols containing up to six hydroxyl groups, said adhesive component being polyvinylamines wherein the organophosphorous compound provides improved rewetting properties to the composition.

16. A modified creping adhesive composition comprising at least one adhesive component and at least one modifier component, said modifier component comprising an organophosphorus compound selected from the list consisting of: glycerophosphate; triethanolamine phosphate esters; sorbitol phosphate esters; and phosphate esters of alcohols and polyols containing up to six hydroxyl groups, said adhesive component being polyamidoamine-epichlorohydrin wherein the organophosphorous compound provides improved rewetting properties to the composition.

* * * * *